Feb. 18, 1930.  M. S. PARKHILL  1,747,878
WATER CONNECTION
Filed June 5, 1929
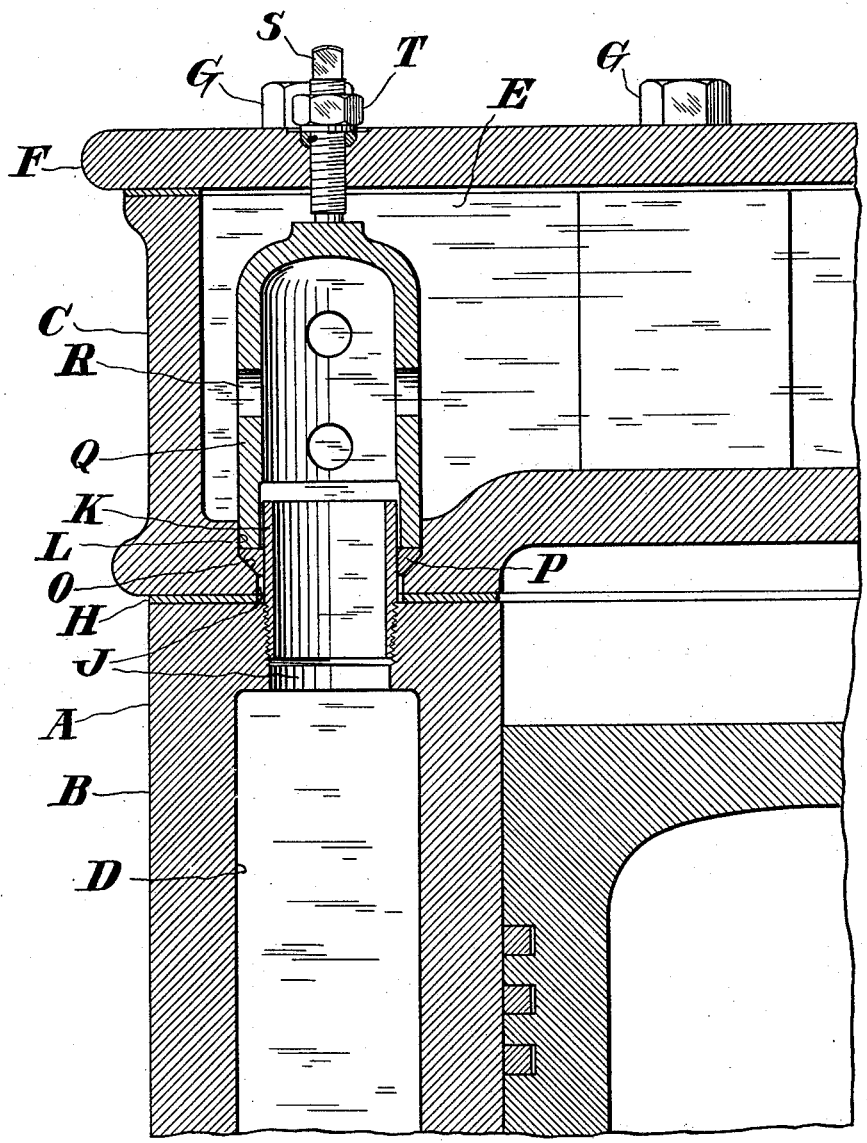
INVENTOR.
Mortimer S. Parkhill
BY
HIS ATTORNEY Patented Feb. 18, 1930

1,747,878

UNITED STATES PATENT OFFICE

MORTIMER S. PARKHILL, OF CORNING, NEW YORK, ASSIGNOR TO INGERSOLL-RAND COMPANY, OF JERSEY CITY, NEW JERSEY, A CORPORATION OF NEW JERSEY

WATER CONNECTION

Application filed June 5, 1929. Serial No. 368,520.

This invention relates to water connections, but more particularly to a connection of this type adapted for use between the water chambers of the casing parts of a compressor, as for instance, between the cylinder and its head.

One object of the invention is to assure against leakage of water at the contiguous surfaces of the cylinder and the head and another object is to enable the seal means to be adjusted from the exterior of the machine.

Other objects will be in part obvious and in part pointed out hereinafter.

The figure in the drawing is a sectional elevation of so much of a compressor as will serve to illustrate the invention and a practical application thereof.

Referring more particularly to the drawing, A generally designates a portion of a compressor comprising a cylinder B and a head C and in which the cylinder B and the head C are provided with the usual water jackets or chambers D and E respectively.

In the construction shown the outer end of the head C is provided with a cover F which may be secured to the head C by means of bolts G. The compressor is shown provided with a gasket H interposed between the cylinder B and the head C to prevent leakage of water from the chambers D and E. Communication between these chambers is afforded by a passage J in the head and the cylinder.

Although the purpose of the gasket H is to assure against leakage of water from the chambers comprising the water jacket or the compressor it has been found that despite the utmost precautions it is a difficult matter to absolutely prevent such leakage. According to the present invention additional means are provided to assure the retention of the cooling water in the chambers. These means comprise a sleeve K in this instance threaded with one end into the cylinder B to form a continuation of the passage J therein and extending through the passage J in the head C and into the chamber E.

The portion of the passage J in the head C is preferably of sufficiently larger diameter than the exterior diameter of the sleeve K so that, irrespective of the degree of expansion or contraction of the parts, the sleeve K will at all times remain out of contact with the head C.

The end of the passage J in the head C adjacent the water chamber E is enlarged as at L and intermediate the enlarged portion L and the passage J is a tapered portion O which forms a seat for packing material P disposed about the sleeve K.

Means are provided for assuring a suitable degree of compression of the packing material. To this end a cup-like member Q is disposed in the chamber E and extends with its open end into the enlarged portion L of the bore J and seats against the packing P. The member Q is provided with suitable apertures R to permit of free circulation of the water through the member Q from one chamber to the other.

To the end that the member Q may be actuated from a point exterior of the compressor a set screw S is threaded into the cover F to act against the end of the member Q, and preferably a lock nut T is disposed on the set screw S to hold said set screw from unthreading in the cover.

In practice the present invention has been found to be unusually efficient. It is particularly desirable in devices of this character since it assures a fluid tight joint which may be constantly maintained. Whenever adjustments of the packing are required these adjustments may be made without necessitating the disassembling of any of the parts of the compressor. Another desirable advantage is that any contractile and expansive movement of the parts comprising the connection between the chambers D and E will not disturb the seal.

I claim:

1. In a water connection, the combination of a pair of hollow members forming chambers for water, a pipe carried by one member to afford communication between the members, packing material in the other member encircling the pipe, means guided by one of the members and seated on the packing material, and means accessible from the exterior of the members and acting against the first said means for compressing the packing material.

2. In a water connection, the combination of a cylinder and a head, each having a chamber for cooling water, a sleeve affording communication between the chambers, packing material encircling the sleeve to prevent leakage of water from the chambers, and means adapted to be actuated from the exterior of the head to compress the packing material.

3. In a water connection, the combination of a cylinder and a head, each having a chamber for cooling water, a pipe threaded in the cylinder and extending into the head, packing material in the head encircling the pipe, a cup shaped member in the head seated on the packing and having apertures to afford communication between the pipe and the chamber in the head, and a screw in the head acting against the cup to compress the packing, said screw being accessible from the exterior of the head.

In testimony whereof I have signed this specification.

MORTIMER S. PARKHILL.